United States Patent Office 3,783,138
Patented Jan. 1, 1974

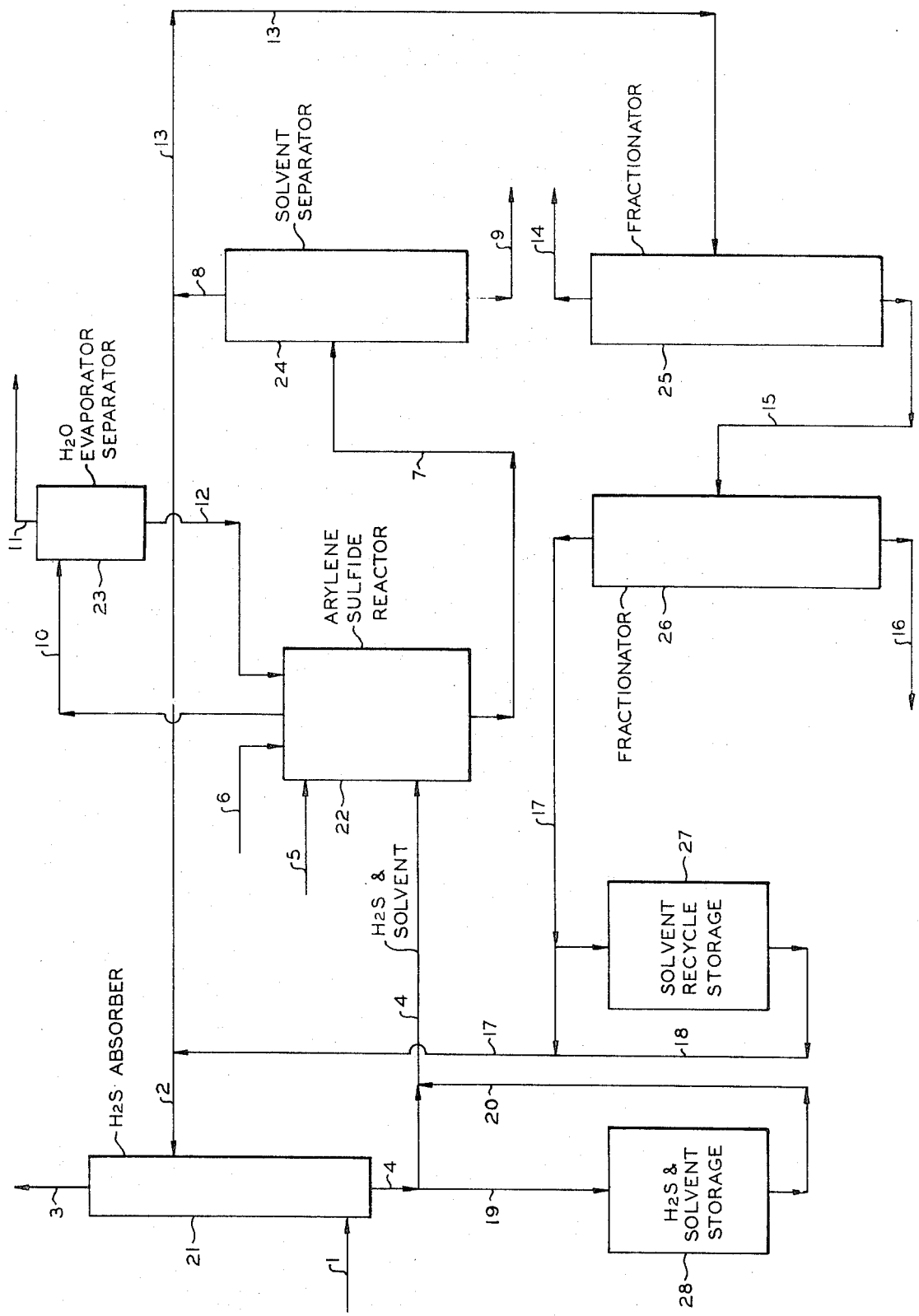

3,783,138
ARYLENE SULFIDE POLYMERIZATION PROCESS
John M. Miles and Fred T. Sherk, Bartlesville, Okla.,
assignors to Phillips Petroleum Company
Filed Dec. 13, 1972, Ser. No. 314,580
Int. Cl. C08g 23/00
U.S. Cl. 260—79
11 Claims

ABSTRACT OF THE DISCLOSURE

An acid gas stream comprising hydrogen sulfide and impurities is passed into an absorption zone containing a polar organic solvent. A first overhead stream rich in impurities and a first bottoms stream comprising a hydrogen sulfide enriched polar organic solvent stream are withdrawn from the absorption zone. The first bottoms stream and an alkali metal hydroxide stream are passed into an arylene sulfide reactor in quantities sufficient to substantially convert all of the hydrogen sulfide to an alkali metal sulfide reactant. Subsequently a polyhalo-substituted aromatic compound is introduced into the reactor under reaction conditions suited to the preparation of arylene sulfide polymers. In a preferred embodiment an arylene sulfide polymer is withdrawn from the reactor in the presence of by-product salt and polar organic solvent, the organic solvent is separated from the arylene sulfide polymer, and the separated polar organic solvent is then passed to the absorption zone for further absorption of hydrogen sulfide.

This invention relates to an improved arylene sulfide polymerization process. Heretofore, attempts to prepare arylene sulfide polymers having substantially uniform melt flow characteristics wherein the alkali metal sulfide reactant has been derived from the reaction of an alkali metal hydroxide with a hydrogen sulfide process stream commonly associated with refinery off gas streams have not been successful. The problems apparently associated with the inability of the prior art to use commercially available hydrogen sufide process streams are believed to be associated with numerous impurities common to said streams such as carbon dioxide, carbonyl sulfide, carbon disulfide, among others. Accordingly, research and development activities were initiated with the objective being the design of a suitable process for the preparation of arylene sulfide polymers wherein the alkali metal sulfide reactant could be prepared utilizing conveniently available hydrogen sulfide refinery off gas streams without introducing into the alkali metal sulfide reactant deleterious impurities derived from the off gas stream.

It is the object of this invention to provide an improved process employing hydrogen sulfide refinery off gas feedstocks for the preparation of an alkali metal sulfide reactant. Another object is to provide a process wherein the arylene sulfide polymer product recovered has substantially uniform melt flow or cure rate characteristics. Still another object is to provide a suitable continuous process for the employment of hydrogen sulfide off gas feedstock in an arylene sulfide polymer process. Still another object is to provide a process wherein the alkali metal sulfide reactant is prepared in an inert atmosphere under process conditions which substantially limit or preclude the presence of oxygen or oxygenated impurities in the alkali metal sulfide reactant. Still further, it is an object to provide a convenient means of separating hydrogen sulfide from constituents which deleteriously affect melt flow characteristics of arylene sulfide polymers by means of a solvent which can be employed in the separation of the hydrogen sulfide from suspect impurities, the preparation of the alkali metal sulfide reactant as well as the arylene sulfide polymer process.

The attainment of the foregoing objects, among others, will be readily apparent from the following description, drawing, and the appended claims.

In accordance with this invention, an improved arylene sulfide polymer process is provided which comprises passing an acid gas stream containing hydrogen sulfide and impurities in to a polar organic solvent within an absorption zone, withdrawing a first overhead stream rich in impurities and a first bottoms stream comprising an $H_2S$ enriched polar organic solvent stream, contacting said first bottoms stream and an alkali metal hydroxide stream in quantities sufficient to substantially convert all of the hydrogen sulfide to an alkali metal sulfide reactant, and subsequently contacting the resulting reaction product with a polyhalo-substituted aromatic compound under conditions suited to the preparation of arylene sulfide polymers. In a preferred embodiment the arylene sulfide polymer is recovered from the reactor in the presence of by-product salt and the polar organic solvent, the polar organic solvent is separated from the reactor effluent and returned to the adsorption zone for further use in hydrogen sulfide absorption.

The process of this invention will be described in greater detail with reference to the accompanying drawing which schematically illustrates an exemplary process embodiment of the present invention.

Referring now to the sole figure, an acid gas stream 1 comprising hydrogen sulfide and impurities such as carbon dioxide, carbonyl sulfide, carbon disulfide, methane, ethane, propane, isobutane, methyl alcohol, or the like, is passed to the $H_2S$ absorber 21 wherein said acid gas stream is contacted with a suitable polar organic solvent introduced into said $H_2S$ adsorber 21 via stream 2. A first overhead stream 3, rich in impurities, is withdrawn from an upper portion of adsorber 21 while a first bottoms stream 4 containing hydrogen sulfide rich polar organic solvent is passed from a lower portion of adsorber 21 to the arylene sulfide reactor 22. Sufficient quantities of alkali metal hydroxide are introduced into the reactor 22 via stream 5 to substantially convert all of the hydrogen sulfide contained within the polar organic solvent stream to alkali metal sulfide reactant. Subsequently, a portion of the water by-product produced by the reaction of the alkali metal hydroxide is removed from reactor 22 along with a minor amount of solvent and passed via stream 10 into $H_2O$ evaporator-separator 23. At least a portion of the water contained therein is removed from said $H_2O$ evaporator-separator 23 via line 11. A portion of the solvent passed to the $H_2O$ evaporator-separator 23 can be returned via stream 12 to the reactor 22 to provide at least a portion of the solvent requirements for the preparation of the arylene sulfide polymer.

A suitable polyhalo-substituted aromatic compound to be reacted with the alkali metal sulfide reactant in the arylene sulfide reactor 22 is passed into reactor 22 via stream 6. The arylene sulfide polymer is then prepared under arylene sulfide polymer process conditions well known to the art, for example those described in U.S. Pat. 3,354,129 or 3,458,486. Following preparation of the arylene sulfide polymer, separation of the polymer from solvent and by-product salt can be carried out by separation processes well known in the art including those described in U.S. Pat. 3,687,907 wherein the insoluble arylene sulfide polymer is separated from an aqueous mixture of the reaction effluent and the polar organic solvent is recovered from the aqueous solution by extraction with a suitable solvent such as dichloromethane, chloroform, methylisobutylketone, or mixtures thereof. Separation of the arylene sulfide polymer from the by-product salt and polar organic solvent can be carried out in the reactor or in a separate solvent separation zone 24 by passage of the reaction products to the solvent separation zone 24 via stream 7. The arylene sulfide polymer can be recovered from the reaction slurry by subjecting said reaction slurry comprising arylene sulfide polymer, polar organic solvent, alkali metal halide (by-product salt) and any other impurities contained therein, to atmospheric adiabatic evaporation whereby the polar organic solvent is separated as an overhead stream via line 8. The separated solvent stream can be recycled or returned to the $H_2S$ absorber zone. In the separation of the polar organic solvent from the arylene sulfide reactant and by-product salt, the effluent stream separated via line 8 can contain, in addition to the organic solvent, excess caustic or alkali metal hydroxide, water and trace quantities of low molecular weight polymer. As an alternative to returning all of the polar organic solvent stream thus constituted to the $H_2S$ absorber zone, at least a portion of the stream can be diverted via line 13 to a fractionator 25. A light overhead fraction comprising alkali metal hydroxide and water can be separated via stream 14 while a first bottoms fractionator stream can be separated via stream 15 and passed to another fractionator 26 for separation therein of a second fractionation bottoms stream 16 comprising essentially low molecular weight polymer and a second fractionation overhead stream 17 comprising essentially residual quantities of the polar organic solvent. The recovered solvent can be stored in solvent recycle storage 27 or recycled directly through line 17 into stream 2. Solvent can be withdrawn from solvent recycle storage zone 27 as needed and passed by means of lines 18, 17 and 2 to absorber 21.

In one modification of the process a storage zone 28 can be employed whereby a portion of the $H_2S$ enriched polar organic solvent effluent stream 4 can be drawn off through line 19 and stored and subsequently returned to the process via line 20 to furnish at least a portion of the $H_2S$ solvent requirements required for the preparation of alkali metal sulfide in the arylene sulfide reactor zone 22.

A preferred embodiment of this invention comprises maintaining the entire process system including the $H_2S$ absorber 21, $H_2S$ solvent storage 28, arylene sulfide reactor 22, $H_2O$ evaporator-separator 23, solvent separator 24, fractionators 25 and 26, and solvent recycle storage 27 under a positive inert atmosphere pressure by means of an inert gas blanket, e.g., nitrogen, argon, etc., or other suitable means in order to preclude or minimize the opportunity for oxygen to become entrained, absorbed, dissolved or dispersed within the reaction process equipment whereby such oxygen could act as a source of oxygen for conversion of at least a portion of the alkali metal sulfide reactant to an undesirable reaction medium such as an alkali metal thiosulfate, e.g., sodium thiosulfate, either prior to, during the preparation of, or after preparation of the arylene sulfide polymer.

In the practice of this invention the extraction or absorption of $H_2S$ can be carried out employing any polar organic solvent which is suitable for the absorption of $H_2S$ as well as being suitable for use as a solvent in the polymerization reaction. Examples of suitable solvents include hexamethylphosphoramide, tetramethylurea, N, N'-ethylenedipyrrolidone, N-methyl - 2 - pyrrolidone, pyrrolidone, caprolactam, N-ethylcaprolactam, sulfolane, and dimethylacetamide, and admixtures thereof. A preferred embodiment of this invention is the extraction of hydrogen sulfide employing N-methylpyrrolidone as the polar organic solvent. Any suitable extraction method can be employed including the methods described in U.S. Pat. 3,324,627 wherein hydrogen sulfide and organic sulfur compounds are absorbed in N-alkylated pyrrolidones. In a preferred embodiment of this invention any organic sulfur compounds contained in the acid gas feedstock stream are removed prior to passage of the acid gas stream to the $H_2S$ absorber by conventional DEA amine treatment of $C_3$ and lighter natural gas stream components. Such pretreatment furnishes an $H_2S$ acid gas feedstock stream containing carbon dioxide, carbonyl sulfide, carbon disulfide, methane, ethane, propane, methyl alcohol essentially free of organic sulfide constituents. In general, any arylene sulfide polymer process conditions suited to batch or continuous operations can be employed in accordance with the prior art teachings for the preparation of arylene sulfide polymers. The process of this invention can be carried out under steady state or transient operating conditions designed to optimize efficient preparation of arylene sulfide polymer in the arylene sulfide reactor zone. In general, the reaction conditions employed within the arylene sulfide reactor 22 can comprise any of those described in the U.S. 3,354,129. Also the reactants, i.e., polyhalo-substituted compounds or any of the alkali metal sulfide reactants disclosed in U.S. 3,354,129 are suitable reactants in accordance with the process of this invention providing the alkali metal sulfide is prepared in accordance with this disclosure. The mol ratio of solvents employed and the proportions of reactant employed can also be any of those disclosed in U.S. 3,354,129 and accordingly said disclosure is incorporated herein by reference. In brief, the process of this invention for the production of the arylene sulfide polymer comprises reacting at least one polyhalo-substituted aromatic compound wherein the halogen atoms are attached to ring carbon atoms with an alkali metal sulfide prepared from the reaction of an alkali metal sulfide and an alkali metal hydroxide, wherein the polymerization reaction is carried out in a polar organic compound at an elevated temperature for a time sufficient to obtain the polymer. The polar organic compound is comprised of a material which will substantially dissolve both the alkali metal sulfide polyhalo-substituted aromatic compound as well as selectively absorb hydrogen sulfide in the $H_2S$ absorber zone as disclosed in the process of this invention.

The $H_2O$ absorber-evaporator zone 23 provides a convenient means for at least partial dehydration of the alkali metal sulfide reactant which as prepared can contain as many as 9 mols of water of hydration. A convenient means of carrying out partial dehydration of the alkali metal sulfide solvent comprises purging the reaction media with an inert gas under positive pressure while heating an alkali metal sulfide reactant in solution in a polar organic solvent, e.g., N-methylpyrrolidone to temperatures within the range of from about 380 to 420° F.

In general, the conditions employed in the solvent separator can vary widely; however, preferably the process conditions employed comprise subjecting a high sensible heat content reaction slurry to atmospheric adiabatic evaporation to remove essentially all of the polar organic diluent.

In the operation of the hydrogen sulfide absorber 21, the absorber can be operated at various operating conditions to give different concentrations of hydrogen sulfide in accordance with the absorption characteristics of the solvent employed. For example, the solubility of hydrogen sulfide in N-methylpyrrolidone at operating pressures of at least approximately 100 p.s.i.a. provides a practical upper limit above which no appreciable improvement in solubility of the hydrogen sulfide in NMP can be anticipated to occur regardless of the NMP temperature. Accordingly, the operating pressure range suited to the practice of this invention wherein NMP is employed as the $H_2S$ solvent is from about 5 to about 100 p.s.i.a. at a temperature within the range of from about 0° to about 200° F. Under temperature and pressure conditions of 100° F. and 50 p.s.i.a. employing N-methylpyrrolidone, sufficient hydrogen sulfide can be absorbed to provide a mol ratio of sodium sulfide to N-methylpyrrolidone of approximately 0.25:1 or at temperature and pressure conditions of 30° F. and 50 p.s.i.a. of 0.40:1.

If desired, the hydrogen sulfide content of the reaction medium can be increased in proportion to that conveniently obtained in the $H_2S$ absorber by separation and concentration of $H_2S$ relative to the extractive solvent with subsequent introduction of a concentrated $H_2S$ stream to the arylene sulfide reactor.

Set out hereafter is an example in further illustration of the invention which is not to be considered as unduly limitative thereof.

EXAMPLE

Set out hereafter are calculated exemplary operating conditions of an arylene sulfide polymer process with the absorption of a hydrogen sulfide acid gas stream in accordance with the process of this invention. Calculated material flow rates and stream compositions set out in Table II correspond with the stream numbers and constituents entering or leaving the various process zones shown in the figure accompanying this specification. The product flow rate values are pounds per hour.

TABLE I

| | Range temperature, °F. | Range pressure, p.s.i.g. |
|---|---|---|
| Arylene sulfide reactor (22) | a 200–240<br>b 200–600 | a 1–5<br>b 1–300 |
| $H_2O$ evaporator separator (23) | 200–400 | 1–5 |
| Solvent separator (24) | 350–425 | 0–5 |
| Fractionator (25) | 225–420 | 5–10 |
| Fractionator (26) | 420–460 | 5–15 |
| $H_2S$ absorber (21) | 100–250 | 50–300 | a Reaction producing alkali metal sulfide.
b Reaction producing polyphenylene sulfide.

TABLE II

| Stream components | 1 | 2 | 3 | 4 | 5 | 6 | 7 | 8 | 9 | 11 | 14 | 17 | 20 |
|---|---|---|---|---|---|---|---|---|---|---|---|---|---|
| $CO_2$ | 26 | | 25 | | | | | | | | | | |
| $H_2S$ | 224 | | Trace | 224 | | | | | | | | | |
| COS | 3 | | 3 | | | | | | | | | | |
| $CS_2$ | Trace | | Trace | | | | | | | | | | |
| $CH_4$ | 1 | | 1 | | | | | | | | | | |
| $C_2H_6$ | 1 | | 1 | | | | | | | | | | |
| $C_3H_8$ | 2 | | 2 | | | | | | | | | | |
| $iC_4H_{10}$ | 1 | | 1 | | | | | | | | | | |
| $CH_3OH$ | 1 | | | 1 | | | | | 1 | | | | |
| NMP | | 2,629 | | 2,629 | | | 2,628 | 2,602 | 26 | 1 | | 17 | 44 |
| NaOH | | | | | | 527 | | | | | | | |
| $H_2O$ | | | | | 226 | | 119 | 119 | | 107 | 119 | | |
| DCB | | | | | | 981 | 10 | 10 | | | 10 | | |
| PPS | | | | | | | 700 | | 700 | | | | |
| Salt | | | | | | | 760 | | 760 | | | | |
| Heavies [1] | | | | | | | 28 | 14 | 14 | | | 14 | |
| Total, lbs./hr | 259 | 2,629 | 33 | 2,854 | 753 | 981 | 4,245 | 2,745 | 1,500 | 109 | 129 | 31 | 44 |

[1] Low-molecular weight polymer: NMP=N-methyl-2-pyrrolidone; DCB=P-dichlorobenzene; PPS=Polyphenylenesulfide.

Reasonable variations and modifications of this invention are possible within the scope of the foregoing disclosure and the appended claims to this invention.

What is claimed is:

1. In a process for the manufacture of an arylene sulfide polymer, the improvement comprising contacting in an absorption zone a polar organic solvent suitable for absorption of $H_2S$ with an acid gas stream comprising $H_2S$ and impurities less absorbable than $H_2S$ in said polar organic solvent;

withdrawing from said absorption zone a first overhead stream rich in said impurities and a first bottoms stream comprising an $H_2S$ enriched polar organic solvent stream;

contacting said first bottoms stream with an alkali metal hydroxide stream in quantities sufficient to substantially convert all of the $H_2S$ to an alkali metal sulfide reactant;

contacting said alkali metal sulfide reactant and polar organic solvent with a polyhalo-substituted aromatic compound in a reaction zone under suitable arylene sulfide reaction conditions;

withdrawing from said reaction zone a reaction effluent stream comprising arylene sulfide polymer, by-product salt, and said polar organic solvent;

separating the polar organic solvent from the arylene sulfide polymer; and passing the thus separated polar organic solvent to said absorption zone.

2. The process of claim 1, further comprising dehydrating the thus formed alkali metal sulfide reactant before contact thereof with said polyhalo-substituted aromatic compound.

3. The process of claim 1, further comprising separating alkali metal hydroxide, water and low molecular weight polymer from the polar solvent after separating the polar solvent from the arylene sulfide polymer.

4. The process of claim 1, wherein said impurities are selected from the class consisting of carbon dioxide, carbonyl sulfide, carbon disulfide, methane, ethane, propane, methyl alcohol, and mixtures thereof, said class being essentially free of any other organic sulfide, and wherein said first overhead stream is essentially free of $H_2S$.

5. The process of claim 1, wherein said solvent is selected from hexamethylphosphoramide, tetramethylurea, N,N'-ethylenedipyrrolidone, N-methyl-2-pyrrolidone, pyrrolidone, caprolactam, N-ethylcaprolactam, sulfolane, dimethylacetamide, and mixtures thereof.

6. The process of claim 1, wherein said steps are carried out under positive pressure process conditions provided by an inert gas.

7. The process of claim 6, wherein said gas is nitrogen.

8. The process of claim 1 wherein said reaction conditions comprise a temperature in the range of about 200 to about 600° F. and a pressure in the range of about 1 to about 300 p.s.i.g.

9. The process of claim 1 wherein said impurities comprise materials selected from the group consisting of carbon dioxide, carbonyl sulfide, carbon disulfide, methane, ethane, propane, isobutane and methyl alcohol.

10. A process for the manufacture of an arylene sulfide polymer comprising contacting in an absorption zone N-methyl - 1,2-pyrrolidone with an acid gas stream comprising $H_2S$ and impurities less readily absorbed in N-methyl-1,2-pyrrolidone than $H_2S$;

withdrawing from said absorption zone a first overhead stream rich in said impurities and a first bottoms stream comprising an $H_2S$ enriched N-methyl-1,2-pyrrolidone stream;

contacting said first bottoms stream with an alkali metal hydroxide stream in quantities sufficient to substantially convert all of the $H_2S$ to an alkali metal sulfide reactant;

contacting said alkali metal sulfide reactant and N-methyl - 1,2 - pyrrolidone with a polyhalo-substituted aromatic compound in a reaction zone under suitable arylene sulfide reaction conditions;

withdrawing from said reaction zone a reaction effluent stream comprising arylene sulfide polymer, by-product salt, and N-methyl-1,2-pyrrolidone;

separating the N-methyl-1,2-pyrrolidone from the arylene sulfide polymer; and passing the thus separated N-methyl - 1,2-pyrrolidone to said absorption zone.

11. The process of claim 10 wherein said reaction conditions comprise a temperature in the range of about 200 to about 600° F. and a pressure in the range of about 1 to about 300 p.s.i.g.

References Cited
UNITED STATES PATENTS 3,457,242  7/1969  Hill, Jr. _____ 260—79

DONALD E. CZAJA, Primary Examiner
M. I. MARQUIS, Assistant Examiner

U.S. Cl. X.R.
260—79.1

UNITED STATES PATENT OFFICE
CERTIFICATE OF CORRECTION

Patent No. 3,783,138    Dated January 1, 1974

Inventor(s) John M. Miles et al.

It is certified that error appears in the above-identified patent and that said Letters Patent are hereby corrected as shown below:

Column 6, lines 57, 57, 63 and 71, delete "1,".

Column 7, lines 1, 2, and 4, delete "1,".

Signed and sealed this 18th day of June 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,783,138   Dated January 1, 1974

Inventor(s) John M. Miles et al.

It is certified that error appears in the above-identified patent and that said Letters Patent are hereby corrected as shown below:

Column 6, lines 57, 59, 63 and 71, delete "1,".

Column 7, lines 1, 2, and 4, delete "1,".

This certificate supersedes Certificate of Correction issued June 18, 1974.

Signed and sealed this 12th day of November 1974.

(SEAL)
Attest:

McCOY M. GIBSON JR.
Attesting Officer

C. MARSHALL DANN
Commissioner of Patents